F. J. & V. E. VINCENT.
EXPANSIBLE PULLEY.
APPLICATION FILED APR. 5, 1912.
1,068,188.
Patented July 22, 1913.
2 SHEETS—SHEET 1.
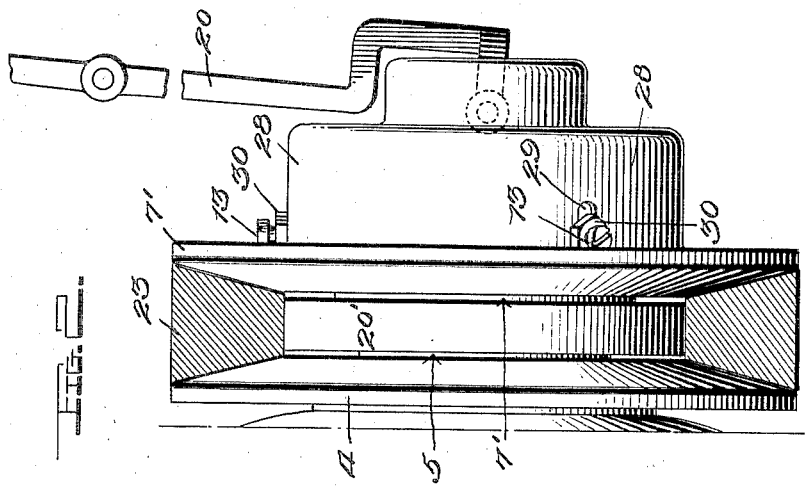
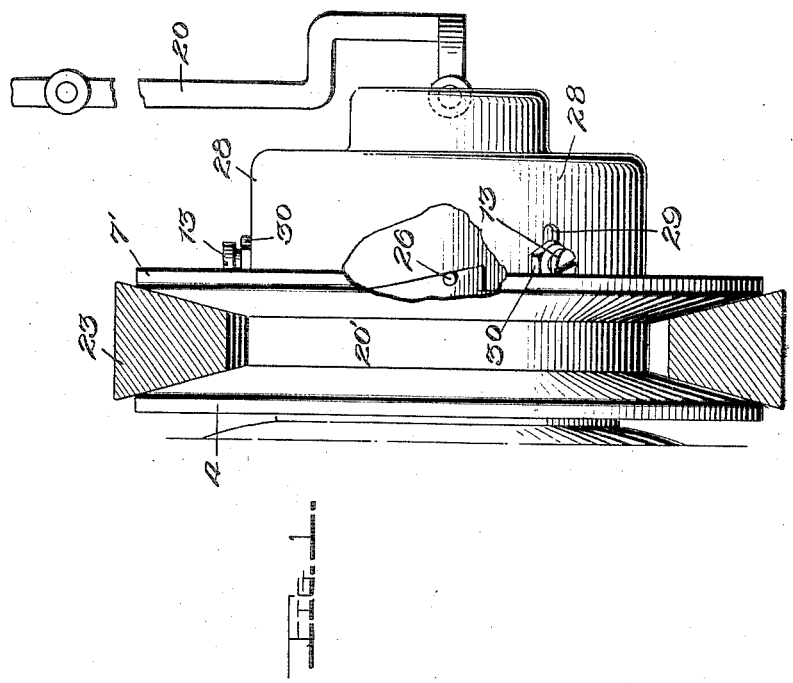
Witnesses
Chas. L. Griesbauer.
A. B. Norton.
Inventors
F. J. Vincent and
V. E. Vincent
By Watson E. Coleman
Attorney F. J. & V. E. VINCENT.
EXPANSIBLE PULLEY.
APPLICATION FILED APR. 5, 1912.
1,068,188.
Patented July 22, 1913.
2 SHEETS—SHEET 2.
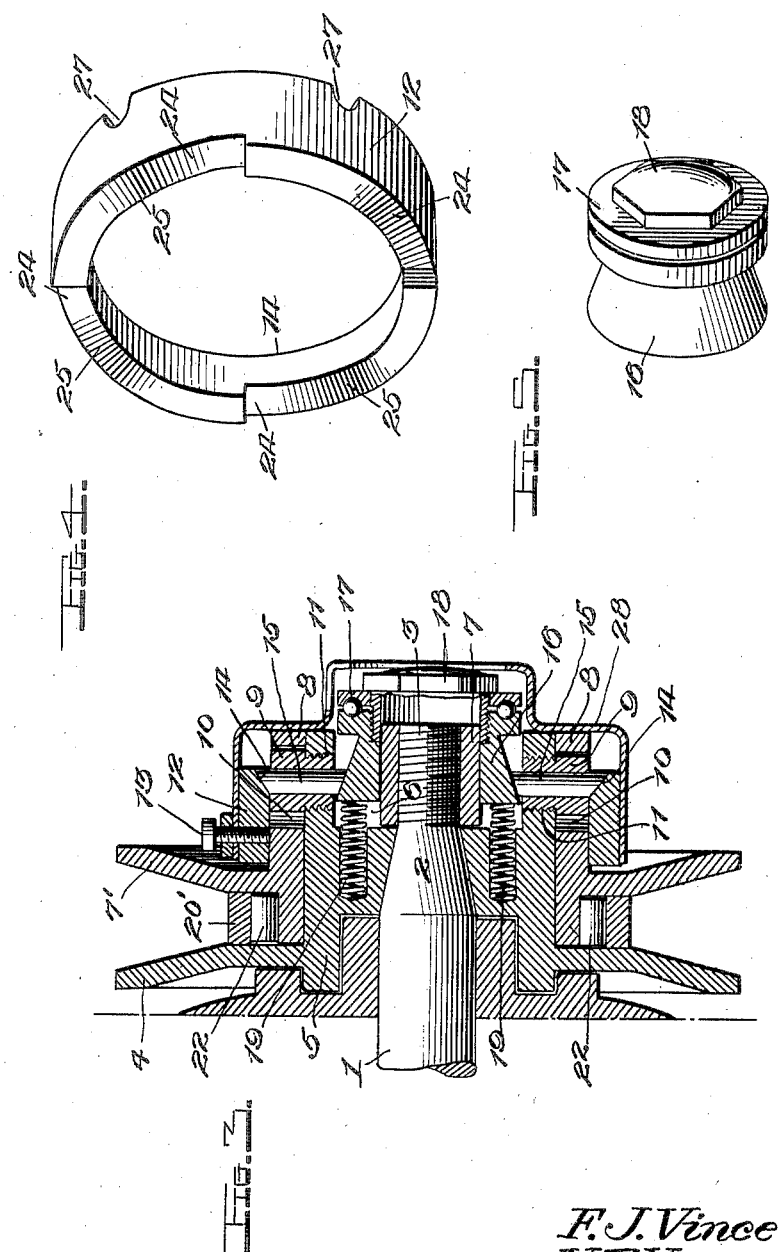
Witnesses
Chas. L. Griesbauer.
A. B. Norton.
Inventors
F. J. Vincent, and
V. E. Vincent
By Watson E. Coleman
Attorney

UNITED STATES PATENT OFFICE.

FERDINAND J. VINCENT AND VENANTIUS E. VINCENT, OF CLEVELAND, OHIO.

EXPANSIBLE PULLEY.

1,068,188.  Specification of Letters Patent.  Patented July 22, 1913.

Application filed April 5, 1912. Serial No. 688,674.

*To all whom it may concern:*

Be it known that we, FERDINAND J. VINCENT and VENANTIUS E. VINCENT, citizens of the United States, residing at Cleveland, in the county of Cuyahoga and State of Ohio, have invented certain new and useful Improvements in Expansible Pulleys, of which the following is a specification, reference being had to the accompanying drawings.

This invention relates to new and useful improvements in variable speed devices and more particularly to an expansible pulley for use on motor cycles and our object is to provide an improved pulley which will permit the vehicle to remain at a stand-still while the engine is in motion.

A further object of the invention resides in providing a pulley which is adapted to be normally effectively disposed, and a still further object of the invention resides in providing a ready and positive means for operating the pulley to its effective position.

Still another object of the invention resides in providing a device which is extremely simple and durable in construction, inexpensive to manufacture and one which will be very efficient and useful in operation.

With these and other objects in view, the invention consists in the novel features of construction, combination and arrangement of parts as will be hereinafter referred to and more particularly pointed out in the specification and claims.

In the accompanying drawings forming a part of this application, Figure 1 is a front elevation of the device showing the same in its effective position and when operating at high speed, parts being broken away and the belt shown in section. Fig. 2 is a similar view showing the pulley running free from engagement with the belt. Fig. 3 is a vertical transverse section through the device. Fig. 4 is a perspective view of the adjusting collar removed; and Fig. 5 is a perspective view of the wedge sleeve and thrust bearing removed.

In describing our invention, we shall refer to the drawings in which similar reference characters designate corresponding parts throughout the several views and in which 1 indicates a crank shaft of a motor carried on a motor cycle, said shaft being tapered adjacent the outer end thereof, as shown at 2, the extreme free end of the same being threaded as shown at 3. To this shaft, the threaded end of which projects beyond the crank case of the motor, is adapted to be applied our improved pulley which comprises an inner flange 4 formed integral with a hub or sleeve portion 5, the bore of which is tapered coincident with the tapered portion 2 of the shaft so as to fit snugly on the latter, and the outer face of the hub portion 5 is provided with a cavity or the like 6 whereby a nut 7 may be readily applied to the threaded portion 3 of the shaft which extends into this cavity. The opposite or outer flange 7' is formed integral with an additional sleeve or hub portion 8, disposed over the sleeve or hub portion 5 and these hub portions are held together so as to rotate with one another by means of a plurality of bushings 9, said bushings extending through slots 10 in the hub portion 8 and threaded into engagement with threaded openings 11 in the hub portion 5.

As stated, the bushings 9 extend through slots 10 in the sleeve portion 8, said slots being lateral so that while the hub 8 and flange 7' may be caused to rotate with the hub 5 and flange 4, the same may be moved laterally with respect to the latter. For the purpose of operating this movable flange, we provide an improved means which first comprises a collar 12 which is adjustably held on the sleeve or hub portion 8 adjacent the flange 7' thereon by means of set screws 13, the outer peripheral edge of said collar being beveled as shown at 14, said collar being adapted for such adjustment on the sleeve or hub 8, as to dispose this beveled edge 14 immediately adjacent the bores of said bushings 9. Slidably disposed through the bores of said bushings are the wedge pins 15, the outer ends of which are beveled coincident with the beveling of the edge 14 of said collar 12 with which they are adapted to contact, and in order to force said wedge pins 15 outwardly through the bushings 9 and into effective engagement with the collar 12, we provide a sleeve wedge 16 which is slidably mounted on the nut 7 and disposed within the cavity 6. This sleeve wedge 16 carries on its outer end a thrust bearing 17 which is held thereon by means of a thrust nut 18 engaged with the outer end of said sleeve and said wedge 16 is adapted to be normally disposed in its effective position by means of a plurality of coil springs 19 which are carried in channels on the outer face of the hub portion 5 and contact with the wedge 16 to force the same outwardly. The inner ends of the wedge pins 15 are beveled coincident to the inclination of the outer periphery of the wedge sleeve 16 and it will be appreciated that as said wedge member 16 is normally forced outwardly by means of the springs 19, the same will force the wedge pins 15 radially therefrom, to contact with the beveled edge 14 of the collar 12. As these pins 15 are forced outwardly into contact with said collar 12, the sleeve or hub 8 with all parts carried thereby will be forced inwardly toward the inner flange 4, this being possible in view of the lateral slots 10. As this is the normal and effective position of the device, a lever 20 is connected with the thrust bearing so that the hub or sleeve portion 8 with its adjunctive parts may be thrown outwardly to an ineffective position, when desired. Thus when the wedge member 16 is in its effective position, the hubs 5 and 8 with their adjunctive parts carried thereon will be caused to rotate, thereby rotating said wedge member and the thrust nut 18, but the thrust bearing 17, it will be seen, will not be rotated in view of its connection with the lower end of the lever 20.

The sleeve or hub portion 8 has the inner portion thereof disposed between the two flanges 4 and 7' about which is circumscribed a collar 20', and said collar is revolubly spaced from the hub or sleeve portion by means of roller bearings 22, whereby the belt 23 which is disposed in engagement with said collar 20' will be obviously unaffected by the rotation of said pulley when the movable flange 7' is disposed to its expanded position. In order to compensate for any wear between the pins 11 and the wedge sleeve 16, we provide means for aiding the adjustment of the collar 12 and to this end, the inner peripheral edge of said collar, is provided with a plurality of notches 24, the one side wall of each of which is beveled or tapered as shown at 25. Secured on the outer peripheral edge of the sleeve or hub portion 8 are an equal number of studs or pins 26 which are arranged in peripheral alinement and are adapted to contact with the beveled or inclined wall 25 of the respective notches in said collar 12. From this construction therefore it will be appreciated that when the collar 12 is turned in one direction, the same will be forced outwardly with respect to the flange 7' and when turned in an opposite direction the same will have a tendency to move inwardly toward said flange. When the collar is turned to such a point that the studs 26 will contact with the opposite walls of the notches 24, additional notches 27 formed in the opposite peripheral edge are adapted to aline with the openings in the bushings 9, whereby the wedge pins 15 may be removed, if desired. In order to provide a neat appearing device and at the same time provide the same with dust proof means, we provide a cover 28 which is adapted to be applied over the collar 12 and is provided with a plurality of slots 29 to receive the projecting adjusting screws 13 therethrough. The outer face of the cover 28 has an opening therein through which the thrust bearing may readily project and locking nuts or the like 30 are adapted to be applied to the set screws 13 so as to lock said cover in position on the device.

In practice, when the movable flange 7' and its adjunctive parts are disposed to their ineffective positions, as shown in Fig. 2, the belt 23 is allowed to contact wholly with the collar 20' which, as will be seen from the foregoing description of the construction of the device, will permit the pulley to be rotated without affecting the collar and belt thereon. In this position, the pulley is said to be running free and when it is desired to cause the belt 23 to be rotated to start the vehicle upon which the same is carried, the lever 20 is released, which action will allow the springs 19 to force the wedge sleeve 16 outwardly into engagement with the sliding wedge pins 15. This action will cause the hub portion 8 with the flange 7' thereon to be disposed inwardly toward the flange 4, thereby permitting the flanges 4 and 7' to tightly bind against the sides of the belt 23 to cause the latter to be rotated therewith and it will be appreciated that at the moment said flanges are caused to contact with said belt, said belt will receive its greatest power and the device may be said to be at low speed. As the device is continued to rotate, the belt 23 will rise with respect to the collar 20', as shown in Fig. 1, and in this position, the device is said to be at high speed.

From the foregoing it will be seen that we have provided a simple, inexpensive and efficient device for carrying out the objects of the invention and while we have particularly described the elements most well adapted to perform the functions set forth, it is obvious that various changes in form, proportion and in the minor details of construction may be resorted to without departing from the spirit or sacrificing any of the principles of the invention.

Having thus described this invention, what we claim is:—

1. In a device of the class described, the combination with a shaft; of a pulley carried thereon comprising a disk having a sleeve portion formed thereon and secured on said shaft, an additional and similar disk movably mounted on the sleeve portion of said other disk, the sleeve portions of said disks being so connected as to rotate one with the other, a collar carried on said last mentioned disk, sliding friction means extending through the sleeve portions of said disks and adapted for engagement with said collar, and additional means carried within the sleeve portion of the first mentioned disk to normally force said sliding friction means to its effective position, whereby said movable disk will be effectively disposed.

2. In a device of the class described, the combination with a shaft; of a pulley carried thereon comprising a disk having a sleeve portion formed thereon, an additional and similar disk mounted on the sleeve portion of said other disk, connecting means between the sleeve portions of said disks to permit rotation of the one with the other and simultaneously allow movement of the last referred to disk with respect to the former, a collar carried on the sleeve portion of the last mentioned disk, sliding wedge members extending through the sleeve portions of both of said disks and adapted for engagement with said collar, and additional means carried on the end of said shaft adapted to normally force said wedge members outwardly into engagement with said collar and simultaneously drive said movable disk to its effective position.

3. In a device of the class described, the combination with a shaft; of a pulley comprising a disk having a sleeve portion formed thereon and securely engaged with said shaft, an additional and similar disk mounted on the sleeve portion of said other disk, means connecting the sleeve portions of said disks to allow rotation of the one with the other and simultaneously permit movement of the last mentioned disk with respect to the former, a collar carried on the sleeve portion of the last mentioned disk, sliding wedge members extending through the sleeve portions of both of said disks and adapted for engagement with said collar, an additional wedge member slidably mounted on the end of said shaft and adapted for engagement with the inner ends of said sliding wedge members, and means to normally force the additional wedge member to its effective position, whereby said last mentioned disk will be effectively disposed.

4. In a device of the class described, the combination with a shaft; of a pulley comprising a disk having a sleeve portion formed thereon and securely engaged with said shaft, an additional and similar disk mounted on the sleeve portion of the aforesaid disk, bushings extending through the sleeve portions of both of said disks to permit rotation of the one with the other, the second mentioned disk having slots in the sleeve portion through which said bushings extend to permit movement of said disk with respect to the other disk, a collar carried on said last mentioned sleeve portion, sliding wedge members extending through said bushings and adapted for engagement with said collar, and means to normally force said wedge members outwardly into engagement with the collar whereby said movable disk will be disposed to its effective position.

5. In a device of the class described, the combination with a shaft; of a pulley comprising a disk having a sleeve portion thereon securely held to said shaft, an additional and similar disk mounted on the sleeve portion of the aforesaid disk, bushings extending through the sleeve portions of both of said disks, the sleeve portion of the last mentioned disk being provided with slots through which said bushings extend to permit movement of this disk with respect to the other, a collar adjustably carried on the sleeve portion of the last mentioned disk, wedge members slidably disposed through said bushings and adapted for engagement with said collar, and an additional wedge member slidably carried on the end of said shaft and adapted to normally force said wedge members outwardly into engagement with said collar, whereby said movable disk will be forced to its effective position.

6. In a device of the class described, the combination with a shaft; of a pulley comprising a disk having a sleeve portion thereon securely held on said shaft, an additional and similar disk carried on the sleeve portion of the aforesaid disk, bushings extending through the sleeve portions of said disks, the sleeve portion of the last mentioned disk being provided with slots through which said bushings extend to permit movement of the last mentioned disk with respect to the other, a collar adjustably mounted on the sleeve portion of said last mentioned disk, means to aid in the adjustment of said collar in position, wedge members slidably disposed through said bushings and adapted for engagement with said collar, an additional wedge member slidably carried on the end of said shaft and adapted for engagement with the inner edge of said sliding wedge members, spring means carried on the sleeve portion of said first mentioned, disk to normally force said last mentioned wedge member into effective position, whereby said movable disk will be forced to its effective position, and means to manually
5 dispose said last mentioned wedge member to its effective position.

In testimony whereof we hereunto affix our signatures in the presence of two witnesses.

FERDINAND J. VINCENT.
VENANTIUS E. VINCENT.

Witnesses:
JAS. F. VANE,
JIN L. HUGHES.